United States Patent
Litke et al.

(10) Patent No.: US 9,056,382 B2
(45) Date of Patent: Jun. 16, 2015

(54) POLISHING PAD, COMPOSITION FOR THE MANUFACTURE THEREOF, AND METHOD OF MAKING AND USING

(75) Inventors: Brian Litke, Brooklyn, CT (US); Michele K. Koss, Woodstock, CT (US)

(73) Assignee: Rogers Corporation, Rogers, CT (US)

( * ) Notice: Subject to any disclaimer, the term of this patent is extended or adjusted under 35 U.S.C. 154(b) by 505 days.

(21) Appl. No.: 12/788,947

(22) Filed: May 27, 2010

(65) Prior Publication Data

US 2011/0130077 A1      Jun. 2, 2011

Related U.S. Application Data (60) Provisional application No. 61/181,398, filed on May 27, 2009.

(51) Int. Cl.

| | |
|---|---|
| *B24B 37/24* | (2012.01) |
| *C08G 18/10* | (2006.01) |
| *C08G 18/22* | (2006.01) |
| *C08L 75/04* | (2006.01) |
| *C08G 101/00* | (2006.01) |
| *C08L 27/18* | (2006.01) |

(52) U.S. Cl.
CPC .............. *B24B 37/24* (2013.01); *C08G 18/10* (2013.01); *C08G 18/222* (2013.01); *C08G 2101/0066* (2013.01); *C08L 27/18* (2013.01); *C08L 75/04* (2013.01)

(58) Field of Classification Search
CPC ...... B24B 37/24; C08G 18/222; C08G 18/10; C08G 18/6607; C08G 2101/0066; C08L 75/04; C08L 27/18; C08L 2666/04
USPC .............. 451/41, 526, 527, 533; 51/296, 297; 521/110, 112, 159, 131, 163, 130; 252/182.24, 182.27, 182.29

See application file for complete search history.

(56) References Cited

U.S. PATENT DOCUMENTS

| | | | | |
|---|---|---|---|---|
| 3,817,882 A | * | 6/1974 | Cox et al. ...................... | 521/112 |
| 4,210,697 A | * | 7/1980 | Adiletta ......................... | 442/87 |

(Continued)

FOREIGN PATENT DOCUMENTS

| | | |
|---|---|---|
| CN | 1235622 A | 11/1999 |
| CN | 100379522 C | 4/2008 |

(Continued)

OTHER PUBLICATIONS

Written Opinion dated Sep. 28, 2010, PCT/US2010/036418, International filing date May 27, 2010, "Polishing Pad, Composition for the Manufacture Thereof, and Method of Making and Using".

(Continued)

*Primary Examiner* — Lee D Wilson
*Assistant Examiner* — Tyrone V Hall, Jr.

(57) ABSTRACT

A polyurethane layer for forming a polishing pad for a semiconductor wafer is described, wherein the polyurethane layer comprises: a foamed polyurethane, wherein the polyurethane foam has a density of about 640 to about 960 kg/m³, and a plurality of cells having an average diameter of about 20 to about 200 micrometers; and particles of a hydrophobic polymer having a critical surface energy of less than 35 mN/m and having a median particle size of 3 to 100 micrometers. Polishing pads as well as methods for polishing are also described.

28 Claims, 3 Drawing Sheets

(56) References Cited

U.S. PATENT DOCUMENTS

| | | | |
|---|---|---|---|
| 4,439,473 A * | 3/1984 | Lippman | 428/90 |
| 4,588,420 A * | 5/1986 | Charvat | 51/298 |
| 5,533,923 A * | 7/1996 | Shamouilian et al. | 451/41 |
| 5,721,284 A | 2/1998 | Smits et al. | |
| 5,856,678 A * | 1/1999 | Smits et al. | 252/182.2 |
| 6,271,276 B1 * | 8/2001 | Gribble et al. | 521/133 |
| 6,372,810 B2 * | 4/2002 | Kazmierski et al. | 521/130 |
| 6,454,634 B1 * | 9/2002 | James et al. | 451/41 |
| 6,514,301 B1 * | 2/2003 | Lombardo | 51/295 |
| 6,582,283 B2 * | 6/2003 | James et al. | 451/41 |
| 6,627,671 B1 * | 9/2003 | Kihara et al. | 521/159 |
| 6,705,934 B1 * | 3/2004 | Shiro et al. | 451/526 |
| 6,777,455 B2 * | 8/2004 | Seyanagi et al. | 521/110 |
| 6,918,821 B2 * | 7/2005 | Balijepalli et al. | 451/41 |
| 7,169,030 B1 * | 1/2007 | Kulp | 451/527 |
| 7,192,340 B2 * | 3/2007 | Ono et al. | 451/526 |
| 2003/0045213 A1 * | 3/2003 | Keipert et al. | 451/57 |
| 2004/0157985 A1 * | 8/2004 | Masui et al. | 524/589 |
| 2004/0259484 A1 * | 12/2004 | Prasad et al. | 451/287 |
| 2005/0042976 A1 * | 2/2005 | Ronay | 451/41 |
| 2005/0101227 A1 | 5/2005 | Balijepalli et al. | |
| 2005/0221723 A1 * | 10/2005 | Duboust et al. | 451/41 |
| 2006/0148391 A1 | 7/2006 | Ono et al. | |
| 2006/0226567 A1 * | 10/2006 | James et al. | 264/45.4 |
| 2006/0276109 A1 * | 12/2006 | Roy et al. | 451/41 |
| 2008/0047205 A1 * | 2/2008 | Feng et al. | 51/295 |
| 2009/0053976 A1 | 2/2009 | Roy | |
| 2009/0062414 A1 * | 3/2009 | Huang et al. | 521/159 |
| 2009/0093201 A1 * | 4/2009 | Kazuno et al. | 451/533 |
| 2009/0137120 A1 * | 5/2009 | Huang et al. | 438/692 |

FOREIGN PATENT DOCUMENTS

| | | |
|---|---|---|
| CN | 101166604 A | 4/2008 |
| CN | 101184582 A | 5/2008 |
| JP | 2003062748 A | 3/2003 |
| JP | 2004188584 A | 7/2004 |
| JP | 2005136400 A | 5/2005 |
| JP | 2007531275 A | 10/2005 |
| JP | 2006502300 A | 1/2006 |
| JP | 2006142439 A | 6/2006 |
| JP | 2007326984 A | 12/2007 |
| JP | 2008539093 A | 11/2008 |
| JP | 2008546167 A | 12/2008 |
| TW | 200524023 A | 7/2005 |
| TW | 200918566 A | 5/2009 |
| WO | 2004024393 A1 | 3/2004 |
| WO | 2006189269 A1 | 8/2006 |
| WO | 2006115924 A1 | 11/2006 |
| WO | 2008123085 A1 | 10/2008 |
| WO | 2009067393 A1 | 5/2009 |

OTHER PUBLICATIONS

Search Report dated Sep. 28, 2010, PCT/US2010/036418, International filing date May 27, 2010, "Polishing Pad, Composition for the Manufacture Thereof, and Method of Making and Using".
Baise, et al., "A New Image Processing Method to Characterize Pad Foam Morphology in Chemical Mechanical Polishing," ECS Trans. 2012, vol. 44, Issue 1, pp. 587-592. Retrieved from the web Aug. 6, 2012.
Cvetkovic, et al., "Investigation on the Impact on Process Quality When Utilizing Different Pads During Chemical Mechanical Polishing of MEMS," Proc. ASPE 22nd Ann. Meet. 2007, Dallas, TX, USA, pp. 469-472. Retreived from the web Aug. 7, 2012.
Rohm and Haas, IC1000 Polishing Pad, brochure, retrieved from the web Aug. 3, 2012.
Chinese Office Action, issued Jul. 8, 2013, Chinese application No. 201080022999.X, issue No. 2013070300852510, PCT/US2010/036418, English translation.
Chinese Office Action, issued Dec. 2, 2013, Chinese application No. 201080022999.X, issue No. 2013070300852510, PCT/US2010/036418, English translation.
Chinese Office Action, issued Mar. 10, 2014, Chinese application No. 201080022999.X, issue No. 2013070300852510, PCT/US2010/036418, English translation.
Japanese Office Action of Apr. 1, 2014, application No. 2012-513257.

* cited by examiner

POLISHING PAD, COMPOSITION FOR THE MANUFACTURE THEREOF, AND METHOD OF MAKING AND USING

CROSS REFERENCE TO RELATED APPLICATION

This application is a US Non-Provisional Application of, and claims the benefit of, U.S. Provisional Application, Ser. No. 61/181,398, filed on May 27, 2009, which is incorporated herein by reference in its entirety.

BACKGROUND

This application relates to articles and methods for chemical-mechanical polishing. In particular, the invention relates to a chemical-mechanical polishing pad for precisely and rapidly polishing a surface of a semiconductor wafer or the like.

In recent years, chemical-mechanical polishing (CMP) has become the technology of choice among semiconductor chip fabricators to planarize the surface of semiconductor chips as circuit pattern layers are laid down. CMP technology is well known, and is typically accomplished using a polishing pad and a polishing composition.

The fabrication of semiconductor wafers typically involves the formation of a plurality of integrated circuits on a semiconductor substrate of, for example, silicon, gallium arsenide, indium phosphide, or the like. The integrated circuits are generally formed by a series of process steps in which patterned layers of materials, such as conductive, insulating, and semiconducting materials, are formed on the substrate. In order to maximize the density of integrated circuits per wafer, an extremely planar, precision-polished substrate is needed at various stages throughout the semiconductor wafer production process. As such, semiconductor wafer production typically involves the use of at least one, and more typically more than one polishing step.

The polishing steps typically involve rotating or rubbing a polishing pad and semiconductor wafer substrate against each other in the presence of a polishing fluid or composition, usually using a controlled and repetitive motion. The pad aids in mechanical polishing of the semiconductor substrate, while the polishing fluid aids in both mechanical and chemical polishing of the substrate and facilitates the removal and transport of abraded material off of and away from the rough surface of the article. Typically, a polishing fluid is interposed between the rough surface of the article that is to be polished and the work surface of the polishing pad. The polishing fluid is often alkaline and may contain an abrasive material, e.g., particulate cerium oxide or silica, among others. Polishing can be used to remove either metals, dielectrics, or other materials in the electronics industry.

Various CMP pads of different materials have been described or are in current use, for example a metal pad described in U.S. Pat. No. 6,022,268; a polishing pad containing particles as described in U.S. Pat. No. 5,489,233; a polishing pad of polymer-impregnated woven fiber sold under the trade name POLITEX; and a pad of a polymer sheet containing void spaces formed by in situ production or incorporation of hollow fill materials (sold under the trademark IC 1000). A composite pad of multiple layers of materials having an outer substrate that contacts the surface of the semiconductor being polished is included among pads in current use. CMP pads made from porous foamed materials are also known. For example, U.S. Pat. No. 6,913,517 describes a microporous polyurethane polishing pad, and U.S. Pat. No. 4,954,141 describes polishing pads made of a foamed fluorine-containing polymer. U.S. Pat. No. 7,059,936 describes a polishing pad having a low surface energy, particularly for use with a hydrophobic polishing composition.

Despite intensive development directed to CMP pads, there remains a continuing perceived need in the art for continual improvement of polishing efficiency and effectiveness, in particular characterized by low defects. With CMP pads, there is often a trade-off between rate of removal, when polishing material away, and defect level in the polished wafer. In other words, a harder pad can result in faster polishing, which in turn can result in higher defects. It would be desirable to obtain a CMP pad that polishes fast, is highly efficient, and yet results in a low defect level.

Further, when using a highly active polishing composition for polishing a semiconductor wafer, the chemical properties and mechanical structure of the CMP pad can deteriorate. As a result, the efficiency of the polishing pad can decrease, for example, the polishing rate can be reduced, and increased surface roughness, undulations, and/or damage can result. Frequent replacement of an expensive polishing pad by a costly new pad is undesirable. Furthermore, even when a pad deteriorates only slightly over time, the conditions of polishing such as working pressure, rotation speed of a polishing plate, and temperature and flow rate of cooling water for the polishing plate can require continuous control to cope with the degree of deterioration, in order to obtain the desired polishing of a surface of a semiconductor wafer. It would be desirable to obtain a CMP pad that has improved resistance to deterioration after repeated polishing of wafers.

Thus, there remains a continuing need in the art for improved CMP pads, particularly pads that provide polished surfaces with low defects. It would be a further advantage for such pads to have good resistance to deterioration, as well as good polishing efficiency, workability, and low cost. It would still further be desirable to more finely control or tailor the abrasive properties of the polishing pad to balance its ability to remove a particular coating without attacking a particular surface material or cause unwanted scratching or other damage. It would also be desirable to be able to economically manufacture and customize such pads for a particular application.

SUMMARY

In order to overcome the problems described above and to accomplish the desired objects, a polyurethane layer comprises: a foamed polyurethane, wherein the polyurethane foam has a density of about 640 to about 1200 kg/m$^3$, a plurality of cells having an average diameter of about 20 to about 200 micrometers, and particles of a hydrophobic polymer having a critical surface energy of less than 35 mN/m and a median particle size of 3 to 100 micrometers. In one embodiment, the layer has a density of about 640 to 960 kg/m$^3$.

In another embodiment, a polyurethane layer for forming a polishing pad for a semiconductor wafer comprises a polyurethane foam having
  a density of about 640 to about 1200 kg/m$^3$, and
  a plurality of cells having an average diameter of 20 to 200 micrometers,
   wherein
the polyurethane layer has:
  a KEL of about 1 to about 500 1/Pa at 50° C.,
  a storage modulus of greater than about 100 MPa in the range of 20° C. to 50° C., a tan δ of less than about 0.070 in the range of 20° C. to 50° C., and a ratio of tan δ at 50° C.:tan δ at 20° C. of 1.2 to 3.0.

In still another embodiment, a polyurethane layer for forming a polishing pad for a semiconductor wafer comprises a polyurethane foam, wherein the polyurethane foam has a density of about 640 to about 1200 kg/m$^3$, and a tan δ of less than 0.070 in the range of 20° C. to 50° C., and a ratio of tan δ at 50° C.:tan δ at 20° C. of 1.2 to 3.0.

In another embodiment, a polishing pad comprises any of the above polyurethane layers.

A method of manufacture of a polishing pad comprises polishing a silicon wafer, comprising applying a particulate media against a surface of the silicon wafer, and rotating a polishing pad relative to said surface, wherein the polishing pad comprises a polishing layer comprising the above polyurethane foam.

The above described and other features and advantages of the present invention will be appreciated and understood by those skilled in the art from the following detailed description and drawings.

DETAILED DESCRIPTION

An improved polishing pad comprises a mechanically frothed polyurethane foam formed from a specific combination of an isocyanate prepolymer, hydroxy-containing compounds, and a silicone surfactant, and comprising particles of a hydrophobic polymer, which results in finer cell size. Such polishing pads have a high polishing rate and provide polished surfaces with very low defects, even at the 0.20 micrometer detection level. Less heat build-up is observed during polishing, which can potentially provide a more stable performance with time. Thus, the polishing pads can also have excellent resistance to deterioration even after prolonged use.

The polishing pads comprise a matrix of a mechanically frothed polyurethane foam and a plurality of particles of hydrophobic particulates, for example, particles of a hydrophobic polymer. As used herein, the term "hydrophobic particulates" means particulates that have a low surface energy, for example, a critical surface tension of less than 40 mN/m, specifically less than 35 mN/m, more specifically not more than 30 mN/m, for example 15 to 25 mN/m. Preferably, therefore, when a polymer is used in the hydrophobic particulates, the polymer contains only a small number, if any, of hydrophilic functional or ionic groups and, more preferably, is free of hydrophilic or ionic groups.

The hydrophobic polymer is not particularly limited and can comprise, or consist essentially of, fluorocarbon, fluorochlorocarbon, a siloxane (e.g., an —R$_2$SiO— unit, where R is independently a hydrogen atom or a hydrocarbon group), or C$_{2-8}$ hydrocarbon repeat units, e.g., ethylene, propylene, butylene, or styrene, or a combination of the foregoing repeat units. Thus, for example, the hydrophobic polymer can include silicone rubber, polydiorganosiloxane (such as poly-dimethylsiloxane), polybutadiene, polyethylene, polypropylene, polystyrene, and polyacrylamide.

In one specific embodiment, the hydrophobic polymer is a fluorinated polymer, also known as a fluoropolymer. "Fluoropolymers" as used herein include homopolymers and copolymers that comprise repeat units derived from a fluorinated alpha-olefin monomer, i.e., an alpha-olefin monomer that includes at least one fluorine atom substituent, and optionally, a non-fluorinated, ethylenically unsaturated monomer reactive with the fluorinated alpha-olefin monomer. Exemplary alpha-olefin monomers include $CF_2=CF_2$, $CHF=CF_2$, $CH_2=CF_2$, $CH=CHF$, $CClF=CF_2$, $CCl_2=CF_2$, $CClF=CClF$, $CHF=CCl_2$, $CH_2=CClF$, and $CCl_2=CClF$, $CF_3CF=CF_2$, $CF_3CF=CHF$, $CF_3CH=CF_2$, $CF_3CH=CH_2$, $CF_3CF=CHF$, $CHF_2CH=CHF$, and $CF_3CH=CH_2$, and perfluoro($C_{2-8}$)alkylvinylethers such as perfluorooctylvinyl ether. Specifically, the fluorinated alpha-olefin monomer is one or more of tetrafluoroethylene ($CF_2=CF_2$), chlorotrifluoroethylene ($CClF=CF_2$), vinylidene fluoride ($CH_2=CF_2$) and hexafluoropropylene ($CF_2=CFCF_3$). Exemplary non-fluorinated monoethylenically unsaturated monomers include ethylene, propylene, butene, and ethylenically unsaturated aromatic monomers such as styrene. Exemplary fluoropolymers include poly(tetrafluoroethylene) homopolymer (PTFE), poly(hexafluoroethylene), poly(tetrafluoroethylene-hexafluoroethylene), and poly(tetrafluoroethylene-ethylene-propylene). A specific exemplary fluoropolymer is PTFE, which can be fibril forming or non-fibril forming.

The particles can be about 3 to about 100 micrometers, specifically about 5 to about 50 micrometers. In one embodiment, particles are about 3 to about 30 micrometers in median diameter, specifically about 25 micrometers, which have been shown to produce a polyurethane foam having an average cell size of about 20 to about 200 micrometers, specifically about 50 to about 100 micrometers, as determined by SEM (scanning electron microscopy). Fluoropolymer particles of that size, for example, are commercially available from a variety of sources. Bimodal, trimodal, and higher modals, of different particle sizes, can be used.

Fluoropolymers can be a fine powder, dispersion, or granular form, including a coagulated dispersion made by coagulation and drying of dispersion-manufactured PTFE. Granular PTFE (polytetrafluoroethylene), FEP (fluorinated ethylene propylene), or PFA (perfluoroalkoxy) made by suspension polymerization can have a median particle size of about 30 to about 40 micrometers for one standard product. The granular fluoropolymers can be cryogenically ground to exhibit a median particle size of less than about 100 micrometers.

When present, the effective particulate fluoropolymer content of the polyurethane-forming composition can be readily determined by one of ordinary skill in the art, depending upon the desired properties of the polishing pad, and the polyurethane formulation. In general, effective quantities are about 0.1 to about 5 weight percent (wt. %) of the total polyurethane forming composition, specifically about 1 to about 4 wt. %, and most specifically about 2 to about 3 wt. % of the total polyurethane forming composition.

Without wishing to be bound by theory, it is believed that incorporation of hydrophobic particles into the polyurethane-forming composition increases the mix viscosity and provides a very fine microcellular structure in the polyurethane. Typically, a very fine cell structure is used to create tiny surface asperities that can hold the abrasive particles of a polishing composition or slurry. Without being bound by theory, it is believed that the presence of the hydrophobic particles increases the stability of small cells in the mechanical frothing process by reducing the surface energy. This results in the presence of a larger quantity of small cells in the polishing pad. It was unexpectedly found that, as a result, certain of the performance properties of the polishing pad were significantly improved, as described in the Examples below, including high polishing efficiency, low polishing temperature, and low level of defects.

In addition, without wishing to be bound by theory, the surface energy of the hydrophobic particles in the polyurethane matrix may disrupt the "wetting out" of the slurry during polishing. Furthermore, it is believed that the presence of the hydrophobic particles in the polyurethane causes slurry particulates, during polishing, to be held longer or trapped in the non-hydrophobic portions of the surface of the polishing pad. It is believed that such phenomena, among others, can account for the polishing pad providing an improved amount of polish without causing defects. The lower surface energy of the hydrophobic particles may also result in less friction during polishing, leading to lower polishing temperatures.

The mechanically frothed polyurethane foam matrix is formed from a reactive composition comprising an organic polyisocyanate component reactive with an active hydrogen-containing component, a foam stabilizing surfactant, and a catalyst. Organic polyisocyanates are of the general formula $Q(NCO)_i$, wherein i is an integer having an average value of greater than two, and Q is a polyurethane radical having a valence of i. $Q(NCO)_i$ is therefore a composition conventionally known as a prepolymer. Such prepolymers are formed by reacting a stoichiometric excess of a polyisocyanate as described above with an active hydrogen-containing component, for example the polyhydroxyl-containing materials or polyols described below. In one embodiment, the polyisocyanate is used in proportions of about 30 percent to about 200 percent stoichiometric excess, the stoichiometry being based upon equivalents of isocyanate group per equivalent of hydroxyl in the polyol. In a specific embodiment, a composition comprising an isocyanate prepolymer is mechanically frothed to obtain a foamed polyurethane material that forms a desirably firm pad. The amount of polyisocyanate used will vary slightly depending upon the nature of the polyurethane being prepared.

The amount of polyisocyanate used in the polyurethane-forming composition will vary depending upon the nature of the polyurethane being prepared. In general, the total —NCO equivalents to total active hydrogen equivalents is such as to provide a ratio of 0.8 to 1.2 equivalents of —NCO per equivalent of active hydrogen, e.g., hydroxyl hydrogen, of the active hydrogen reactant, and preferably a ratio of about 1.0 to 1.05 equivalents of —NCO per active hydrogen.

The active hydrogen-containing component can comprise a mixture of different types of active hydrogen-containing components, including triols, diols, and compounds having an average hydroxyl functionality of greater than 3.

In particular, the active hydrogen-containing component comprises polyester polyols and/or polyether polyols. Suitable polyester polyols are inclusive of polycondensation products of polyols with dicarboxylic acids or ester-forming derivatives thereof (such as anhydrides, esters and halides), polylactone polyols obtainable by ring-opening polymerization of lactones in the presence of polyols, polycarbonate polyols obtainable by reaction of carbonate diesters with polyols, and castor oil polyols. Suitable dicarboxylic acids and derivatives of dicarboxylic acids which are useful for producing polycondensation polyester polyols are aliphatic or cycloaliphatic dicarboxylic acids such as glutaric, adipic, sebacic, fumaric, and maleic acids; dimeric acids; aromatic dicarboxylic acids such as phthalic, isophthalic, and terephthalic acids; tribasic or higher functional polycarboxylic acids such as pyromellitic acid; as well as anhydrides and second alkyl esters such as maleic anhydride, phthalic anhydride, and dimethyl terephthalate. The polymers of cyclic esters can also be used. The preparation of cyclic ester polymers from at least one cyclic ester monomer is exemplified by U.S. Pat. Nos. 3,021,309 through 3,021,317; 3,169,945; and 2,962,524. Suitable cyclic ester monomers include but are not limited to δ-valerolactone; ∈-caprolactone; zeta-enantholactone; the monoalkyl-valerolactones, e.g., the monomethyl-, monoethyl-, and monohexyl-valerolactones. In general the polyester polyol may comprise caprolactone based polyester polyols, aromatic polyester polyols, ethylene glycol adipate based polyols, and mixtures comprising any one of the foregoing polyester polyols. Polyester polyols made from ∈-caprolactones, adipic acid, phthalic anhydride, and terephthalic acid or dimethyl esters of terephthalic acid are generally preferred.

Polyether polyols can be obtained by the chemical addition of alkylene oxides, such as ethylene oxide, propylene oxide and mixtures thereof, to water or polyhydric organic components, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [4,4-pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5; 1,1,1-tris[2-hydroxyethoxy)methyl]-ethane, 1,1,1-tris[2-hydroxypropoxy)-methyl]propane, diethylene glycol, dipropylene glycol, pentaerythritol, sorbitol, sucrose, lactose, alpha-methylglucoside, alpha-hydroxyalkylglucoside, novolac polymers, phosphoric acid, benzenephosphoric acid, polyphosphoric acids such as tripolyphosphoric acid and tetrapolyphosphoric acid, ternary condensation products, and the like. The alkylene oxides used in producing polyoxyalkylene polyols normally have from 2 to 4 carbon atoms. Exemplary alkylene oxides are propylene oxide and mixtures of propylene oxide with ethylene oxide. Polytetramethylene polyether diol or glycol, and mixture with one or more other polyols, can be specifically mentioned. The polyols listed above can be used per se as the active hydrogen component.

A specific class of polyether polyols is represented generally by the formula $R[(OC_nH_{2n})_zOH]_a$ wherein R is hydrogen or a polyvalent hydrocarbon radical; a is an integer (i.e., 2 to 8) equal to the valence of R, n in each occurrence is an integer from 2 to 4 inclusive (preferably 3) and z in each occurrence is an integer having a value of 2 to 200, preferably 15 to 100. Specifically, the polyether polyol can have the formula $R[(OC_4H_8)_zOH]_2$, wherein R is a divalent hydrocarbon radical and z in each occurrence is 2 to about 40, specifically 5 to 25.

Another type of active hydrogen-containing material that can be used is a polymer polyol composition obtained by polymerizing ethylenically unsaturated monomers with a polyol as described in U.S. Pat. No. 3,383,351, the disclosure of which is incorporated herein by reference. Suitable monomers for producing such compositions include acrylonitrile, vinyl chloride, styrene, butadiene, vinylidene chloride, and other ethylenically unsaturated monomers as identified and described in the above-mentioned U.S. Patent. Suitable polyols include those listed and described hereinabove and in U.S. Pat. No. 3,383,351. The active hydrogen-containing component may also contain polyhydroxyl-containing compounds such as hydroxyl-terminated polyhydrocarbons (U.S. Pat. No. 2,877,212); hydroxyl-terminated polyformals (U.S. Pat. No. 2,870,097); fatty acid triglycerides (U.S. Pat. Nos. 2,833,730 and 2,878,601); hydroxyl-terminated polyesters (U.S. Pat. Nos. 2,698,838, 2,921,915, 2,591,884, 2,866,762, 2,850,476, 2,602,783, 2,729,618, 2,779,689, 2,811,493, 2,621,166 and 3,169,945); hydroxymethyl-terminated perfluoromethylenes (U.S. Pat. Nos. 2,911,390 and 2,902,473); hydroxyl-terminated polyalkylene ether glycols (U.S. Pat. No. 2,808,391; British Patent No. 733,624); hydroxyl-terminated polyalkylenearylene ether glycols (U.S. Pat. No. 2,808,391); and hydroxyl-terminated polyalkylene ether triols (U.S. Pat. No. 2,866,774).

In a specific embodiment, the active hydrogen-containing component comprises a higher molecular weight polyether polyol and/or polyester polyol and a very low molecular weight polyol as a chain extender or crosslinking agent. Preferred polyether polyols include polyoxyalkylene diols and triols, and polyoxyalkylene diols and triols with polystyrene and/or polyacrylonitrile grafted onto the polymer chain, and mixtures thereof. Preferred polyester polyols are based on caprolactone.

Exemplary very low molecular weight chain extenders and cross-linking agents include alkane diols and dialkylene glycols and/or polyhydric alcohols, preferably triols and tetrols, having a molecular weight from about 200 to 400. The chain extenders and cross-linking agents are used in amounts from about 0.5 to about 20 percent by weight, preferably from about 10 to 15 percent by weight, based on the total weight of the active-hydrogen-containing component.

Thus, in one embodiment, the polyol component comprises a polymeric diol having a weight average molecular weight of from about 650 to about 2900, specifically of between 1000 and 2800, more specifically 1500 to 2500. The polymeric diol can have a hydroxy number of 10 to 200, preferably a hydroxy number of 15 to 50, more preferably 20 to 40. A preferred polymeric diol is a polyoxyalkylene polyol. In a specific embodiment, the polymeric diol is a polyether oxide diol, more specifically a polyether glycol. The use of polytetramethylene ether glycol was found advantageous for improved abrasion compared to other diols.

The polyol can further comprise a triol. In one embodiment, the triol has a weight average molecular weight (Mw) that is 80 to 2000, preferably 100 to 1000, more preferably 150 to 400. (Unless otherwise herein indicated, all molecular weights are weight average molecular weights.) The hydroxy number can be 200 to 2000, preferably 500 to 1500. A preferred triol is a polycaprolactone triol.

In another embodiment, the polyol component further comprises a very low molecular weight (below about 200) diol, including but not being limited to, dipropylene glycol, 1,4-butanediol, 2-methyl-1,3-propanediol, and 3-methyl-1,5-pentane diol. This compound can function as a chain extender in the reaction mixture for the polyurethane.

In one embodiment, the reaction mixture for forming the polyurethane comprises a polymeric diol, triol, and a low molecular weight diol as a chain extender, in combination with a polyisocyanate prepolymer. In this embodiment, the weight average molecular weights of the polymeric diol is greater than that of the triol and diol compound by at least about 1000. Specifically, the active hydrogen-containing component comprises about 50 to about 90 parts by weight (pbw) of the polymeric diol, specifically a polyether glycol, about 5 to about 25 pbw of a triol, specifically a triol having an Mw of about 80 to about 2000, and about 1 to about 25 pbw of a chain extender. In another embodiment, the active hydrogen-containing component comprises about 60 to about 80 parts by weight (pbw) of the polymeric diol, specifically a polyether glycol, about 10 to about 20 pbw of a triol, and about 1 to about 20 pbw of a chain extender.

In general, the average wt. percent hydroxy, based on the hydroxyl numbers of the hydroxyl-containing compounds (including all polyols or diols), including other cross-linking additives, fillers, surfactants, catalysts and pigments, if used, can be about 150 to about 350 in various embodiments, depending on the desired firmness or softness of the polishing pad for a particular application. For example, a relatively firmer pad can have a total hydroxy number of 300-350, a softer pad can have a total hydroxy number of 150-200, and a mid-range pad can have a hydroxy number of 200 to 300. The hydroxyl number is defined as the number of milligrams of potassium hydroxide required for the complete neutralization of the hydrolysis product of the fully acetylated derivative prepared from 1 gram of polyol or mixtures of polyols with or without other cross-linking additives. The hydroxyl number can also be defined by the equation:

$$OH = \frac{56.1 \times 1000 \times f}{M.W.}$$

wherein OH is the hydroxyl number of the polyol, f is the average functionality that is the average number of hydroxyl groups per molecule of polyol, and M.W. is the average molecular weight of the polyol.

The particular polyol components, i.e., the molecular weights and the hydroxyl number are further selected so as to provide a molecular weight between crosslinks of about 2,000 to about 10,000 Daltons, preferably about 3,000 to about 6,000 Daltons. The molecular weight between crosslinks ($M_c$) is calculated by dividing the total weight of material by the sum of the moles of each reactive component each multiplied by its functionality minus 2.

A wide variety of surfactants can be used for stabilizing the polyurethane foam before it is cured, including mixtures of surfactants. An organosilicone surfactant, for example, is a copolymer consisting essentially of $SiO_2$ (silicate) units and $(CH_3)_3SiO_{0.5}$ (trimethylsiloxy) units in a molar ratio of silicate to trimethylsiloxy units of about 0.8:1 to about 2.2:1, specifically about 1:1 to about 2.0:1. Another organosilicone surfactant stabilizer is a partially cross-linked siloxane-polyoxyalkylene block copolymer and mixtures thereof wherein the siloxane blocks and polyoxyalkylene blocks are linked by silicon to carbon, or by silicon to oxygen to carbon, linkages. The siloxane blocks comprise hydrocarbon-siloxane groups and have an average of at least two valences of silicon per block combined in said linkages. At least a portion of the polyoxyalkylene blocks comprise oxyalkylene groups and are polyvalent, i.e., have at least two valences of carbon and/or carbon-bonded oxygen per block combined in said linkages. Any remaining polyoxyalkylene blocks comprise oxyalkylene groups and are monovalent, i.e., have only one valence of carbon or carbon-bonded oxygen per block combined in said linkages. A comb structure can also be used with a polydimethylsiloxane backbone and soluble pendent groups. Additionally, conventional organopolysiloxane-polyoxyalkylene block copolymers such as those described in U.S. Pat. Nos. 2,834,748; 2,846,458; 2,868,824; 2,917,480; and 3,057,901 can be used. The amount of the organosilicone polymer used as a foam stabilizer can vary, e.g., 0.5 wt. % to 10 wt. % parts or greater based on the amount of the active hydrogen component. The amount of organosilicone surfactant in the polyurethane formulations, in one embodiment, is about 1.0 wt. % to about 6.0 wt. % on the same basis.

A number of the catalysts conventionally used to catalyze the reaction of the isocyanate component with the active hydrogen-containing component can be used in the foam preparation. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N'N'-tetramethyl-1,3-butanediamine, N,N-dimethylethanolamine, N,N-diethylethanolamine, 1,3,5-tris (N,N-dimethylaminopropyl)-s-hexahydrotriazine, o- and p-(dimethylaminomethyl)phenols, 2,4,6-tris(dimethylaminomethyl)phenol, N,N-dimethylcyclohexylamine, pentamethyldiethylenetriamine, 1,4-diazobicyclo [2.2.2]octane, N-hydroxyl-alkyl quaternary ammonium carboxylates and tetramethylammonium formate, tetramethylammonium acetate, tetramethylammonium 2-ethylhexanoate, and the like, as well as compositions comprising any one of the foregoing catalysts.

Metal acetyl acetonates are preferred, based on metals such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc and zirconium. A specific catalyst is bis(2,4-pentanedionate) nickel (II) (also known as nickel acetylacetonate or diacetylacetonate nickel) and derivatives thereof such as diacetonitrilediacetylacetonato nickel, diphenylnitrilediacetylacetonato nickel, bis(triphenylphosphine)diacetyl acetylacetonato nickel, and the like. Ferric acetylacetonate (FeAA) has good relative stability, good catalytic activity, and lack of toxicity.

In one embodiment acetyl acetone (2,4-pentanedione) is added to a metal acetyl acetonate (or other catalyst), as disclosed in commonly assigned U.S. Pat. No. 5,733,945 to Simpson, which is incorporated herein by reference. The acetyl acetone provides heat latency, which allows time for the required mixing, casting, and other procedures, and avoids deleterious premature curing during low temperature processing. However, as the material is cured in several heating zones and the temperature of the urethane mixture rises, the acetyl acetone is driven off. With the removal of acetyl acetone together with its associated delaying function, the metal acetyl acetonate is allowed to resume its normally high reactivity and provide a very high level of catalysis at the end of the polyurethane reaction. This high reactivity late in the processing cycle is advantageous and provides improved physical properties such as compression set. In this embodiment, the ratio of metal acetyl acetonate to acetyl acetone is about 2:1 on a weight basis.

The amount of catalyst present in the reactive composition can be about 0.03 wt % to about 3.0 wt %, based on the weight of the active hydrogen-containing component.

In one embodiment, when water is used as the blowing agent, FeAA is selected as the catalyst. Other catalysts or adjuvants, e.g., amines, can be used to adjust the relative reaction rates of water and urethane. The water reacts with the isocyanate releasing $CO_2$. The use of FeAA with acetyl acetone catalyzes the curing reaction in a delayed fashion, which prevents premature curing and therefore allows the chemical (and optionally physical) blowing to continue unhindered. The catalyst eventually permits a full cure of the polyurethane foam. The metal acetylacetonate is most conveniently added by predissolution in a suitable solvent such as dipropylene glycol or other hydroxyl containing components which will then participate in the reaction and become part of the final product.

The polyurethane-forming composition can further comprise other optional additives depending on the desired properties of the polishing pad, for example, its abrasive or other properties, and its particular use as a polishing pad on various work pieces. Exemplary additives include dyes, pigments (for example, titanium dioxide and iron oxide), antioxidants, antiozonants, flame retardants, UV stabilizers, conductive fillers, conductive polymers, and the like.

The polishing pad can optionally contain additional particles, e.g., particles other than the above-described hydrophobic particles that are incorporated into the material of the pad. The particles can be abrasive particles, polymer particles, composite particles (e.g., encapsulated particles), organic particles, inorganic particles, clarifying particles, water-soluble particles, and mixtures thereof. The polymer particles, composite particles, organic particles, inorganic particles, clarifying particles, and water-soluble particles can be abrasive, or non-abrasive, in nature. The abrasive particles, for example, can be a metal oxide, such as a metal oxide selected from the group consisting of alumina, silica, titania, ceria, zirconia, germania, magnesia, co-formed products thereof, and combinations thereof, or a silicon carbide, boron nitride, diamond, garnet, or ceramic abrasive material. The abrasive particles can be hybrids of metal oxides and ceramics or hybrids of inorganic and organic materials. The particles also can be polymer particles such as polystyrene particles, polymethylmethacrylate particles, liquid crystalline polymers (LCP, e.g., aromatic copolyesters containing naphthalene units), polyetheretherketones (PEEK's), particulate thermoplastic polymers (e.g., particulate thermoplastic polyurethane), particulate cross-linked polymers (e.g., particulate cross-linked polyurethane or polyepoxide), or a combination thereof, as described in U.S. Pat. No. 7,204,742. The composite particles contain a solid core (e.g., a metal oxide, metal, ceramic, or polymer) and a polymeric shell (e.g., polyurethane, nylon, or polyethylene). The clarifying particles can be phyllosilicates, (e.g., micas such as fluorinated micas, and clays such as talc, kaolinite, montmorillonite, hectorite), glass fibers, glass beads, diamond particles, carbon fibers, and the like.

Small amounts of water or an auxiliary blowing agent can be present in the polyurethane-forming compositions. For example, high-boiling fluorocarbons, e.g., those boiling above about 40° C. can be used. Specific fluorocarbons include the Ucon fluorocarbons and FREONS boiling above about 40° C., for example 1,1,2-trichloro-1,2,2-trifluoroethane and isomers of tetrachlorodifluoroethane, tetrachloromonofluoroethane, and the like. The auxiliary agent, although it is not necessary, can be used for purposes of providing an added expansion during heat curing in those cases where such added expansion is desired.

The foamed material is produced by mechanically mixing the reactive composition (i.e., isocyanate component, active hydrogen-containing component, hydrocarbon particles, froth-stabilizing surfactant, catalyst and other optional additives) with a froth-forming gas in a predetermined amount. An inert gas is incorporated into the liquid phase by mechanical beating of the liquid phase in high shear equipment such as a Hobart mixer or an Oakes mixer. Mechanical blowing is preferred, as it is more likely to lead to spherical cells than chemically blown foams. The gas phase of the froths is most preferably air because of its cheapness and ready availability. However, if desired, other gases can be used which are gaseous at ambient conditions and which are substantially inert or non-reactive with any component of the liquid phase. Such other gases include, for example, nitrogen, carbon dioxide, and fluorocarbons that are normally gaseous at ambient temperatures. The gas can be introduced under pressure as in the usual operation of an Oakes mixer or it can be drawn in from the overlying atmosphere by the beating or whipping action as in a Hobart mixer. The mechanical beating operation preferably is conducted at pressures not greater than 100 to 200 psig (pounds force per square inch gauge). Conventional, readily available mixing equipment can be used and no special equipment is necessary. The amount of inert gas beaten into the liquid phase should be adequate to provide a froth having a density at ambient atmospheric pressure of about 30 to about 60 pcf (pounds per cubic foot), specifically about 45 to about 55 pcf and less than about 50% to about 90% of the density of the liquid phase prior to frothing. The mechanical beating can be conducted over a period of a few seconds in an Oakes mixer, or for about 3 to 30 minutes in a Hobart mixer, or however long it takes to obtain the desired froth density in the mixing equipment employed. The froth as it emerges from the mechanical beating operation is substantially chemically stable and is structurally stable but easily workable at ambient temperatures, e.g., about 15° C. to about 30° C. The consistency of the froth resembles the consistency of aerosol-dispensed shaving cream.

The frothed mixture can be continuously fed onto a substrate film, which can also be utilized as transfer means in the production process. A substrate film can also be referred to herein as a first carrier or bottom carrier layer, but it can also be stationary, depending on the particular process. Furthermore, the upper side of the frothed mixture can be provided with a surface protective film, also referred to herein as a second or top carrier. Thus, if desired, the frothed reactive composition can be sandwiched between upper and lower two films, and shaped into a sheet form with its surface protected from roughening and its thickness controlled, whereby a foamed polyurethane sheet is produced from which the polishing pad can be formed.

In another embodiment, the foam may be produced by a combination of mechanical frothing and blowing. In one manner of proceeding, the components for producing the low density foams, i.e., the isocyanate component, the active hydrogen containing component, hydrophobic particles, catalyst, blowing agents and any other additives are first mixed together and then subjected to mechanical frothing with air. Alternatively, the components may be added sequentially to the liquid phase during the mechanical frothing process.

In practice, a substrate or carrier can be played out from supply rolls and ultimately rewound on take-up rolls upon separation from the cured polyurethane foam. The selection of materials for the substrate can depend on factors such as the desired degree of support and flexibility, the desired degree of releasability from the cured foam, cost, and the like considerations. Paper, thin sheets of metal such as stainless steel, or polymer films such as polyethylene terephthalate, silicone, or the like can be used. The material can be coated with a release coating. In one embodiment, the substrate can be coated with a material intended to be transferred to the surface of the cured polyurethane foam, for example a polyurethane film that is releasable from the substrate. A fibrous web or other filler material can be disposed on the surface of the substrate, and thereby become ultimately incorporated into the cured foam. In another embodiment, the foam cures to a substrate. Thus, a substrate can be optionally part of the final product, instead of being separated from the foam. In one embodiment, a conveyor belt can be used as a substrate and have a plain or a textured surface.

In a specific embodiment, in order to enhance the structural strength of an article such as a chemical-mechanical polishing pad and to improve the handling properties of the product, a substrate film is cured to a polyurethane foam sheet, i.e., is bound to the polyurethane sheet. As hereinafter described with respect to a production method, this substrate film can also serve as a transfer means for the frothed reactive composition in a production apparatus, such as described in U.S. Pat. No. 7,338,983. Therefore, the substrate film can be a polymer having low heat-shrinkable properties, such as polyethylene terephthalate (PET), the polymer having a physical strength resistible to a tensile force applied by a roller machine, and resistance properties to heat applied by a heating means. In addition, a film comprising a polymer such as polyolefin, polyester, polyamide, or polyvinyl chloride can be also used. The thicknesses of the films will not adversely affect the polishing properties of the article even when the substrate film is bonded to a polyurethane foam sheet. In a specific embodiment, the foam is cast onto a first layer of a polyurethane foam, as in U.S. Pat. No. 6,884,156 to Cabot or U.S. Pat. No. 6,635,688 to World Properties, Inc. The foam pad can be integrally bonded, or laminated using an adhesive, to form a composite structure. In another embodiment, the polishing pad can be a composite pad comprising an unfrothed top polishing pad that is simultaneously cast with a mechanically frothed subpad.

In one embodiment, after the polyurethane material is cast onto a substrate, the composition (after optional blowing) is delivered to a heating zone for cure of the polyurethane foams. The temperatures are maintained in a range suitable for curing the foam, for example at about 90° C. to about 220° C., depending on the composition of the foam material. Differential temperatures can be established for purposes of forming an integral skin on an outside surface of the foam.

After the foam is heated and cured, it can then be passed to a cooling zone where it is cooled by any suitable cooling device such as fans. In one embodiment, where appropriate, the substrate is removed and the foam can be taken up on a roll. Alternatively, the foam can be subjected to further processing, for example lamination (bonding using heat and pressure) to a substrate, if desired.

In a final step, in one embodiment, a long, foamed polyurethane sheet is obtained, which can be punched out in the shape of a CMP pad as a final product. A final inspection can then be carried out. Alternatively, the foamed polyurethane sheet may be cut into individual sheets, while a final inspection is carried out, so as to be shipped in its current final shape for later processing into individual CMP pads. The thickness of the cured polyurethane foam is about 0.5 to about 5.0 mm, specifically about 1.0 to about 3.0 mm.

The polishing layer can be modified by buffing or conditioning, such as by moving the pad against an abrasive surface. The preferred abrasive surface for conditioning is a disk which is preferably metal and which is preferably embedded with diamonds of a size in the range of 1 μm to 0.5 mm.

Optionally, conditioning can be conducted in the presence of a conditioning fluid, preferably a water-based fluid containing abrasive particles.

The polishing layer further comprises grooves, channels, and/or perforations. Such features can facilitate the lateral transport of a polishing composition across the surface of the polishing layer. The grooves, channels, and/or perforations can be in any suitable pattern and can have any suitable depth and width. The polishing pad substrate can have two or more different groove patterns, for example a combination of large grooves and small grooves as described in U.S. Pat. No. 5,489,233. The grooves can be in the form of linear grooves, slanted grooves, concentric grooves, spiral or circular grooves, or XY crosshatch pattern, and can be continuous or non-continuous in connectivity. The polishing pad substrate optionally further comprises one or more apertures, transparent regions, or translucent regions (e.g., windows as described in U.S. Pat. No. 5,893,796). The inclusion of such apertures or translucent regions (i.e., optically transmissive regions) is desirable when the polishing pad substrate is to be used in conjunction with an in situ CMP process monitoring technique.

The performance of the polishing pad material can also be influenced and sometimes controlled through other physical properties of the polishing pad, although pad performance is also dependent on all aspects of the polishing process and the interactions between pad, slurry, polishing tool, and polishing conditions, for example.

In order to provide desired mechanical properties to the foam, particularly superior polishing properties for a polyurethane foam, the average cellular diameter of the foam can be about 20 to about 150 micrometers, preferably about 50 to about 100 micrometers.

In one embodiment, the polishing pads have a density of 30 to 65 pounds per cubic foot (pcf), or 480 to 1040 kilograms per cubic meter ($kg/m^3$), specifically 40 to 60 pcf, (640 to 960 $kg/m^3$).

Surface roughness values are measured after conditioning. In some embodiments, the polishing pad has a surface roughness of about 2 to about 25 micrometer Ra, specifically about 3 to about 20 micrometer Ra.

The polishing pads can have a hardness of about 45 to about 65 Shore D. In yet other embodiments, the polishing pads have a hardness of about 55 to about 63 Shore D.

In one embodiment, the surface energy of the polishing pad after grinding can be about 15 to about 50 mN/m, specifically about 20 to about 40 mN/m, more specifically about 30 to about 35 mN/m, based on the Fowkes Method employing the Sessile drop contact-angle measurement technique. For this embodiment, the skin surface of the polyurethane material, as produced (before grinding) can be about 10 to about 35 mN/m, specifically about 15 to about 30 mN/m, more specifically about 20 to about 25 mN/m, based on the Fowkes Method employing the Sessile drop contact-angle measurement technique, as described in the Examples below.

The polishing pads can be characterized by techniques of dynamic mechanical analysis (as described in J. D. Ferry, "Viscoelastic Properties of Polymers", New York, Wiley. 1961 which is hereby incorporated by reference in its entirety). Viscoelastic materials exhibit both viscous and elastic behavior in response to an applied deformation. The resulting stress signal can be separated into two components: an elastic stress which is in phase with the strain, and a viscous stress which is in phase with the strain rate but 90 degrees out of phase with the strain. The elastic stress is a measure of the degree to which a material behaves as an elastic solid; the viscous stress measures the degree to which the material behaves as an ideal fluid. The elastic and viscous stresses are related to material properties through the ratio of stress to strain (this ratio can be defined as the modulus). Thus, the ratio of elastic stress to strain is the storage (or elastic) modulus and the ratio of the viscous stress to strain is the loss (or viscous) modulus. When testing is done in tension or compression, E' and E" designate the storage and loss modulus, respectively.

The ratio of the loss modulus to the storage modulus is the tangent of the phase angle shift ($\delta$) between the stress and the strain. According to the equation, $E''/E' = \tan \delta$ and is a measure of the damping ability of the material.

In addition to the parameter tan $\delta$, as defined above, another parameter for predicting polishing performance is known as the "Energy Loss Factor," ASTM D4092-90 ("Standard Terminology Relating to Dynamic Mechanical Measurements of Plastics"), incorporated by reference in its entirety, which defines this parameter as the energy per unit volume lost in each deformation cycle. In other words, it is a measure of the area within the stress-strain hysteresis loop.

The Energy Loss Factor (KEL) is a function of both tan $\delta$ and the elastic storage modulus (E') and may be defined by the following equation:

$$KEL = \tan \delta * 10^{12}/[E'*(1+\tan \delta^2)]$$

wherein E' is in Pascals.

The higher the value of KEL for a pad, generally the lower the elastic rebound. During the polishing cycle, energy is transmitted to the pad. A portion of this energy is dissipated as heat, and the remaining portion is stored in the pad and subsequently released as elastic energy during the polishing cycle. Generally, the higher the value of KEL for a pad, the lower the elastic rebound. To increase the KEL value, the pad can be made softer. However, this approach can tend to reduce the stiffness of the pad, resulting in decreased polishing efficiency as well as other potential problems.

The storage modulus (E') and Energy Loss Factor (KEL) can be measured using the method of Dynamic Mechanical Analysis at a temperature of 0° C., 20° C., 40° C., 50° C. and 70° C., and frequency of 10 radians/sec. KEL is calculated using the equation defined above. The ratio of the Modulus or KEL can also be measured at various temperatures, especially at temperatures that represent the useful temperature range for polishing. Ideally, Modulus or KEL will change as little as possible and in a linear trend with increasing temperature (i.e. a ratio of the values at two temperatures approaches unity).

In one embodiment, the polyurethane polishing layer exhibits a storage modulus (E') of greater than about 100 MPa, specifically about 100 to about 1000 MPa, each over a range of 20° C. to 50° C. Such firmer polishing pads are useful as, e.g., a copper or oxide polishing pad. In another embodiment, the polyurethane layer exhibits a storage modulus (E') of about 40 to about 200 MPa over a range of 20° C. to 50° C. These softer pads are useful, e.g., as a barrier polishing pad. In either of the foregoing embodiments, the polyurethane layer can exhibit a ratio of E' at 50° C.:E' at 20° C. of less than 1.0, specifically about 0.5 to about 0.8. In yet other embodiments, the polishing pads have a storage modulus E' of 250 to 650 MPa in the range of 20° C. to 50° C., specifically 300 to 600 MPa at 40° C.

In one embodiment the polyurethane layer can exhibit a KEL of about 1 to about 500 1/Pa, specifically about 10 to about 400 1/Pa at 50° C., more specifically about 50 to about 300, each in the range of 20° C. to 50° C. In yet other embodiments, the polyurethane layer can have a KEL of 100 to 250 1/Pa at 50° C. These ranges are suitable for a firmer polishing pad that can be used, e.g., for copper or oxide polishing. It is also possible to manufacture polishing pads having a KEL of greater than about 1,000 at 50° C., which can be useful for, e.g., barrier polishing pads. In any of the foregoing embodiments, the polyurethane layer can have a ratio of KEL at 50° C.:KEL at 20° C. of less than 5.0, specifically 1.0 to 4.0.

The polyurethane can exhibit a tan δ of less than 0.070 in the range of 20° C. to 50° C. The polyurethane can exhibit a ratio of tan δ at 50° C.:tan δ at 20° C. of 1.2 to 3.0. Again without wishing to be bound by theory, it is believed that the improved performance of the polishing pads, in particular the lower polishing temperatures, are due to the low tan delta (higher resilience) of the polishing pads described herein. It is believed that the higher resilience provides polishing performance with faster recovery between polishing passes, and lower heat generation than less resilient polishing pads. Since less energy is converted to heat, lower polishing temperatures result. Further, since the ratio of the modulus and the tan delta is flat between 20 and 50° C., the performance of the polishing pads is consistent in this temperature range.

The polishing pad is characterized by a lower defect rate during use. As demonstrated in the examples, a defect rate of less than 3500, specifically less than 2000, more specifically less than 1500 can be obtained based on a 0.25 μm cutoff. A defect rate of less than 20000, specifically less than 10000, more specifically less than 5000 can be obtained at a 0.20 um cutoff.

The polishing pad can be used alone, or optionally can be mated to a pad carrier. When the polishing pad is mated to the pad carrier, the polishing pad is intended to contact the work piece to be polished and serves as the polishing layer, while the substrate serves as a subpad.

In a specific embodiment, the foam is cast onto a first, uncured layer of a polyurethane foam, as described in U.S. Pat. No. 6,635,688 to World Properties, Inc. Subsequent curing of both pads provides an integrally bonded composite polishing pad.

Other exemplary subpads include polyurethane foam subpads, impregnated felt subpads, microporous polyurethane subpads, and sintered urethane subpads. The polishing layer and/or the subpad optionally comprises grooves, channels, hollow sections, windows, apertures, and the like. The subpad can be affixed to the polishing layer by any suitable means. For example, the polishing layer and subpad can be affixed through adhesives or can be attached via welding or similar technique. An intermediate backing layer such as a poly(ethylene terephthalate) film can be disposed between the polishing layer and the subpad.

These substrates for the pad can be produced by means known in the art. For example, the pad substrate can be produced by extruding one of the aforesaid polymers. The extruded copolymer or polymer can optionally be modified to increase the porosity or void volume.

The polishing pad is particularly suited for use in conjunction with a chemical-mechanical polishing (CMP) apparatus. Typically, the apparatus comprises a platen, which, when in use, is in motion and has a velocity that results from orbital, linear, or circular motion. The polishing pad substrate is in contact with the platen and moves with the platen when in motion. The apparatus can further comprise a carrier that holds a work piece to be polished by contacting, and moving relative thereto, the polishing surface of the polishing pad. The polishing of the work piece typically takes place with a polishing composition introduced between the work piece and the polishing pad as they move relative to each other, so as to abrade at least a slight portion of the work piece in order to polish the work piece. The CMP apparatus can be any suitable CMP apparatus, many of which are known in the art. The polishing pad also can be used with linear polishing tools.

In one particular embodiment of polishing surfaces, a conventional polishing machine employs a down force of 35 to 700, preferably 70 to 500 g/cm$^2$ (0.5 to 10 psi, specifically 1 to 6 psi), a platen speed of 25 to 400 rpm, preferably 50 to 200 rpm, a carrier speed of 25 to 400 rpm, preferably 50 to 200 rpm, and a media flow of 20 to 500, specifically 100 to 200 ml/min.

The working film, or surface layer of the work piece, that is the subject of chemical mechanical polishing according to the present invention can be a silicon oxide film, amorphous silicon film, polycrystalline silicon film, single-crystal silicon film, silicon nitride film, pure tungsten film, pure aluminum film or pure copper film, or an alloy film of tungsten, aluminum or copper with another metal, formed on a wafer during manufacture of a semiconductor device such as a VLSI or the like. The working film may also be an oxide or nitride film of a metal, for example, tantalum or titanium.

When the surface of the working film is a metal, the polishing rate can be vastly improved by adding an oxidizing agent to the polishing composition applied during the polishing operation. The oxidizing agent used can be appropriately selected, for example, based on the electrochemical properties of the working surface.

Other work pieces that can be polished with the polishing pad include memory storage devices, glass substrates, memory or rigid disks, metals (e.g., noble metals), magnetic heads, inter-layer dielectric (ILD) layers, polymeric films (e.g., organic polymers), low and high dielectric constant films, ferroelectrics, micro-electro-mechanical systems (MEMS), field emission displays, and other microelectronic work pieces, especially microelectronic work pieces comprising insulating layers (e.g., a metal oxide, silicon nitride, or low dielectric material) and/or metal-containing layers (e.g., copper, tantalum, tungsten, aluminum, nickel, titanium, platinum, ruthenium, rhodium, iridium, silver, gold, alloys thereof, and mixtures thereof). The term "memory or rigid disk" refers to any magnetic disk, hard disk, rigid disk, or memory disk for retaining information in electromagnetic form. Memory or rigid disks typically have a surface that comprises nickel-phosphorus, but the surface can comprise any other suitable material. Suitable metal oxide insulating layers include, for example, alumina, silica, titania, ceria, zirconia, germania, magnesia, and combinations thereof. In addition, the work piece can comprise, consist essentially of, or consist of any suitable metal composite. Suitable metal composites include, for example, metal nitrides (e.g., tantalum nitride, titanium nitride, and tungsten nitride), metal carbides (e.g., silicon carbide and tungsten carbide), metal silicides (e.g., tungsten silicide and titanium silicide), nickel-phosphorus, alumino-borosilicate, borosilicate glass, phosphosilicate glass (PSG), borophosphosilicate glass (BPSG), silicon/germanium alloys, and silicon/germanium/carbon alloys. The work piece also can comprise, consist essentially of, or consist of any suitable semiconductor base material. Suitable semiconductor base materials include monocrystalline silicon, polycrystalline silicon, amorphous silicon, silicon-on-insulator, and gallium arsenide. The work piece can comprise a metal layer, more preferably a metal layer selected from the group consisting of copper, tungsten, tantalum, platinum, aluminum, and combinations thereof.

The polishing pad can be used for applications where the surface being polished is susceptible to damage. In one embodiment, the method is used in the microelectronics industry to remove excess metal and/or dielectrics from integrated circuits, for example, on a wafer. In particular, removal of selected layers from an integrated circuit is facilitated, i.e., the polishing pad as described herein improves the removal process without damaging the delicate printed circuit lines or the underlying substrate material.

A wide variety of polishing compositions can be used with the polishing pad. Such compositions typically comprise a liquid carrier (e.g., water, or a mixed medium containing an organic solvent such as an alcohol in combination with water), an abrasive (e.g., alumina, silica, titania, ceria, zirconia, germania, magnesia, and combinations thereof), and optionally one or more additives such as oxidizing agents (e.g., peracetic acid, perbenzoic acid, tertbutylhydroperoxide, hydrogen peroxide, ammonium persulfate, potassium permanganate, potassium bichromate, potassium iodate, perchloric acid, potassium ferricyanide, iron nitrate, cerium ammonium nitrate, silicotungstic acid, phosphotungstic acid, silicomolybdic acid, and phosphomolybdic acid), corrosion inhibitors (e.g., benzotriazole), film-forming agents (e.g., polyacrylic acid and polystyrenesulfonic acid), complexing agents (e.g., mono-, di-, and poly-carboxylic acids, phosphonic acids, and sulfonic acids), chelating agents (e.g., triazole, indole, benzimidazole, benzoxazole-benzotriazole, quinoline, quinolinic acid, quinoxaline, benzoquinoline, benzoxidine, ammonia, ethylenediamine, triethanolamine, glycine, alanine, leucine, glutamine, glutamic acid, tryptophan, 5-amino-1H-tetrazole, 7-hydroxy-5-methyl-1,3,4-triazaindolazine, benzoguanamine, salicylaldoxime, adenine, guanine, phthalazine, 5-methyl-1H-benzotriazole, and 4-amino-1,2,4-triazole), organic acids (e.g., para-toluenesulfonic acid, dodecylbenzenesulfonic acid, isoprenesulfonic acid, gluconic acid, lactic acid, citric acid, tartaric acid, malic acid, glycolic acid, malonic acid, formic acid, oxalic acid, succinic acid, fumaric acid, maleic acid, and phthalic acid), pH adjusters (e.g., hydrochloric acid, sulfuric acid, phosphoric acid, sodium hydroxide, potassium hydroxide, rubidium hydroxide, cesium hydroxide, and ammonium hydroxide), buffering agents (e.g., phosphate buffers, acetate buffers, and sulfate buffers), ionic or non-ionic surfactants, deflocculants, viscosity modifiers, wetting agents, cleaning agents, and combinations thereof. The selection of the components of the polishing composition, which can be used with the polishing pad, and the relative amounts thereof, depends primarily on the type of work piece being polished. It will be appreciated that the components of a slurry can be combined in various ways to form the slurry in situ.

The invention is further illustrated by the following non-limiting examples.

EXAMPLES

In the following examples, the materials shown in Table 1 were used.

separately pumped into the mixing head at a controlled flow rate relative to the flow rate of part A. Flow meters were used to measure and adjust the flow rates of the various raw material streams. Dry air was introduced into the mixing head using a gas flow rate controller to adjust the airflow rate so as to create froth.

After mixing and mechanical frothing in the high shear mixer, the foam was pumped through a flexible hose and out through a rigid nozzle. The foams were then cast onto a coated release paper that had been dried by passing it through an infrared dryer just prior to the point where the foam was introduced. The release paper was drawn through the machine at controlled speed.

The coated release paper was then passed through a curing section for about 2 to about 8 minutes, consisting of exposure to heated platens kept at 120° C. to 190° C. by a series of thermocouples, controllers, and heating elements. A series of upper platens were kept at 220° C. The cured product was then passed through a cooling section. The resulting sheet was die cut, the top surface was planarized, a groove pattern put into the planarized surface, and the product mounted to a subpad as described below to provide a finished polishing pad. A plurality of specimens was obtained for evaluating performance as a chemical-mechanical polishing pad.

The samples were tested using the following methods and conditions.

Storage modulus was determined as described in U.S. Pat. No. 7,217,179 using a strip having a width of 3 mm, a thickness of 1.5 mm and a length of 19 mm cut from a cured polyurethane sheet. The strip was measured in a DMA operating in tensile mode a frequency of 1.6 Hz, 0.5 N static force, a dynamic bias of 0.05%, and an initial load of 50 g. The sample was equilibrated at −20° C. for 10 minutes and then ramped at a rate of 5° C. per min to 120° C. using a commercially available dynamic viscoelasticity measuring instrument.

Energy loss factor (KEL), E' ratio, and tan δ were determined by ASTM D4092-90 ("Standard Terminology Relating to Dynamic Mechanical Measurements of Plastics"),

TABLE 1

| Component | Description and Trade Name | Supplier |
|---|---|---|
| PTMEG | Poly(tetramethylene ether) diol or glycol having a hydroxyl number of about 56 (Terethane 2000) (Polymeric polyol) | Invista |
| MP diol | 2-Methyl-1,3-propanediol (chain extender) | — |
| Triol | Polycaprolactone triol, weight average molecular weight ($M_w$) = 300, OH value (mg KOH/g) = 560 (CAPA 3031) | Perstop Ltd. (Cheshire, UK) |
| Isocyanate | MDI prepolymer, a modified MDI compound produced by reacting high-purity diphenylmethane diisocyanate with sufficient glycol to allow handling down to 80° F. (ISONATE ™ 181) | Dow Chemical Co. (Midland, MI) |
| Hydrophobic Particle | Poly(tetrafluoroethylene), granular powder having a particle size of 25.0 micrometers, bulk density of 0.330 g/cc, tensile strength at break of 42.0 MPa and elongation at break of 350% (Fluon ® G163 PTFE) | Asahi (Japan) |
| Surfactant | Silicon surfactant and stabilizer (DABCO DC-5598) | Air Products (PA) |
| Catalyst-1 | Iron acetyl acetonate dispersed in polyol with acetyl acetonate (OH No. = 56) | Alfa Aesar (MA) |
| Catalyst-2 | Iron acetyl acetonate dispersed in diol with acetyl acetonate (OH No. = 1247) | Alfa Aesar (MA) |

An exemplary process for the production of the polyurethane foams used in the examples is as follows. Part A (the polyol component, catalyst, and surfactant (foam stabilizer) and any other additives were mixed and placed in a holding tank with agitation and under dry nitrogen. This mixture was then pumped at a controlled flow rate to an Oakes-type high shear mixing head. Part B (the isocyanate component) was incorporated by reference in its entirety. Measurement conditions were as described above.

Unless otherwise indicated, the weight of each of the specimens was determined using an electronic force balance, and the density was calculated using the formula: Density (kg/m$^3$)=[Weight (kg) of Specimen]/[Volume (m$^3$) of Specimen].

Cell size was determined by a scanning electron microscope (SEM).

The Surface Energy of the surfaces of the pad with a skin, as produced before being ground and after being ground, was determined using sessile drop goniometry. This technique is a known method used to characterize surface energy. Sessile drop contact angles of water and diiodomethane were measured using image analysis (Tangent Method 1) with the Kruss DSA-10 MK2 prop Shape Analysis System. Droplets were delivered at a controlled rate and volume, with specimens held in place on a vacuum stage. The two-component Fowkes Method was used to generate surface energy values from the mean (n=10) contact angle data. Effort was made to place the droplets between the surface features of the polishing pads, such as grooves or perforations, and drop size was reduced to avoid capillary interaction with the grooves. The data excluded measurements where droplet distortion was evident and the mean (left and right) contact angles exceeded +/−1 degree. The test liquids are described in Table 2.

TABLE 2

| Test Liquid: | Reference Source | Reference surface tension (mN/m) | | | Percent | |
| --- | --- | --- | --- | --- | --- | --- |
| | | Total | Disperse | Polar | Disperse | Polar |
| Water* (1.5 μL) | Gebhardt | 72.80 | 46.80 | 26.00 | 64.29% | 35.71% |
| Diiodomethane (1.0-1.5 μL) | Fowkes | 50.80 | 48.50 | 2.30 | 95.47% | 4.53% |

*High purity reagent grade water (conforms to ASTM D-1193, Type I)

The CMP polishing pads were tested for chemical mechanical polishing of copper using an IPEC 372M-165 polishing machine. The polishing composition was DAN-ANO Cu390 (800 g slurry, 300 g. distilled water, 138 g of $H_2O_2$).

Pads were analyzed for total number of defects using a 0.25 micrometer or 0.20 micrometer size cut-off, employing screen capture of the defect analysis, in which color of spots in an image were used represent the size and number of defects in a wafer using an AMAT/Orbot WS-736.

Example 1

A polyurethane layer was prepared by the above-described process using the formulation shown in Table 3.

TABLE 3

| Component | Ex. 1 Parts |
| --- | --- |
| Part A | |
| PTMEG | 60.60 |
| MP Diol | 13.70 |
| Triol | 13.41 |
| Surfactant | 1.88 |
| Catalyst-1 | 5.81 |
| PTFE No. 2 | 4.61 |
| Total, Part A | 100.01 |
| OH # | 284 |
| Part B | |
| Isocyanate | 94.46 |
| Total parts | |

The materials produced in accordance with this formulation were rigid, microporous, high modulus polyurethanes. The $M_c$ (molecular weight between crosslinks) of the foamed, cured polyurethanes was equal to 4521.33 for Example 1.

To test the material for use in CMP polishing, copper planarization was conducted using a polishing pad (Example P-1) made from the formulation of Example 1, which was then compared to a conventional IC1000 CMP pad manufactured by Rohm and Haas. The IC1000 CMP pad was tested with a SUBA IV subpad manufactured by Rohm and Haas (the "C-1" pad). In order to retain consistency, the inventive polishing pad P-1 was hand-laminated onto a SUBA IV subpad. The polishing pads made in accordance with the invention, however, were only 19.5 inches in diameter versus 22.5 inches in diameter for the IC1000 polishing pad, which matches the diameter of the platen of the polishing machine. Compensation for this discrepancy was achieved by shortening the oscillation of the arm of the polishing machine during polishing of the wafer to a narrower sweep. This was done for both the IC1000 CMP pad and the exemplary CMP pad for consistency.

Removal rate (RR) and "within wafer nonuniformity" (WI-WNU) were both determined. While the pads were conditioning on the platen with distilled water, the IC1000 CMP pad exhibited a smooth, well wet-out appearance. In comparison, inventive Pad P-1 exhibited a discontinuous wet-out that was believed to be due to the incorporation of the PTFE filler.

Certain polishing parameters were tested in order to determine their effect on the removal rate profile, including the back pressure behind the wafer, A more uniform removal rate was achieved using a back pressure of 3 psi and a slurry flow rate of 200 mL/min slurry flow rate.

Polishing of wafers, also referred to as planarization, was evaluated after a standard pad conditioning cycle of 10 minutes followed by planarization of 10 filler wafers (6 oxide fillers and 4 copper fillers), followed by a copper monitor wafer for removal rate evaluation. This was sequentially followed by two more copper filler wafers and a second copper monitor wafer. For the inventive Pad P-1, a sequentially third copper monitor wafer was polished. All CMP process conditions were based on the optimal conditions for the pad determined as described above. The wafers were cleaned using a standard cleaning process to help obtain accurate defectivity measurements.

Copper monitor wafers were polished using the indicated pre-polishing sequence, and their removal rate profiles were measured. Screen capture of the defect analysis was obtained for the wafers polished by the P-1 and C-1 pads. The results are shown in Table 4.

TABLE 4

| Wafer No. | CMP Polishing Pad | Pre-Polishing Sequence | Removal Rate (Angstroms/min) | WIWNU (Percent) | Total Defects 0.25 μm cutoff | Total Defects 0.20 μm cutoff |
|---|---|---|---|---|---|---|
| 1A | Ex. C-1 (IC 1000) | 10 fillers | 9484 | 3.9% | 4,110 | 30,987 |
| 2A | | 10 fillers Wafer no. 1A 2 Cu fillers | 9350 | 4.7% | 4,028 | |
| 1B | Ex. P-1 | 10 fillers | 9342 | 4.4% | 1,136 | 3,546 |
| 2B | | 10 fillers Wafer no. 1B 2 Cu filler | 9495 | 3.7% | 787 | 2,608 |
| 3B | | 10 fillers Wafer no. 1B Wafer No. 2B | 9474 | 2.7% | 761 | 2,855 |

These experimental results show that for copper planarization, the IC 1000 CMP pad provided a removal rate of about 9,400 Angstroms/min, a WIWNU of about 4%, and about 4,000 total defects (0.25 μm cutoff). The inventive Pad P-1 showed a comparable removal rate (about 9,500 Angstroms/min) and WIWNU (about 4%), with greatly reduced total defects (800-1,000). This is a 4-fold reduction over the IC 1000 pad polished wafers. If the cutoff for the defect analysis is changed from 0.25 micrometers to 0.20 micrometers (a more difficult test to pass), the decrease in the number of defects for the inventive samples is even more striking: about 31,000 total defects for the prior art top pad and about 2,600 to 4,000 for the inventive pads. These results indicated that the excellent polishing performance of the present CMP pads provided improved performance compared to a CMP pad meeting industry standards.

In addition to the results shown in table 4, the polishing temperature of the surface of the pad during polishing was measured using an IR thermal gauge. Comparative Pad C-1 had a temperature of 125° F. (52.7° C.), while the inventive pad P-1 had a lower temperature of 119° F. (48.3° C.). Another run using another sample of the comparative Pad C-1 and a pad manufactured using the formulation in Table 3 had a surface temperature during polishing of 120° (48.9° C.) and 110° F. (43.3° C.)

To determine whether extended polishing would affect defectivity, removal rate, or uniformity, of the inventive pad, the previously tested Pad P-1, made using the formulation of Example 1, were used to sequentially polish additional wafers as indicated in Table 5. The procedure was to sequentially polish an additional two oxide fillers, followed by an additional two copper fillers, and then a copper monitor wafer. This cycle was repeated four times. Thus, for example, for the last Monitor Wafer 7, the Pad P-1, in addition to the sequential polishing in Table 4, had additionally polished the following sequence of wafers: 2 oxide fillers, 2 copper fillers, monitor wafer no. 4, 2 oxide fillers, 2 copper fillers, monitor wafer no. 5, 2 oxide fillers, 2 copper fillers, monitor wafer no. 6, 2 oxide fillers, 2 copper fillers, and monitor wafer no. 7. Results are shown in Table 5 below.

TABLE 5

| Monitor Wafer No. | Supplemental Pre-Polishing Sequence | Removal Rate (Angstroms/min) | WIWNU (Percent) | Total Defects 0.25 μm cutoff | Total Defects 0.20 μm cutoff |
|---|---|---|---|---|---|
| 4 | 2 Ox filler 2 Cu filler | 9568 | 3.5% | 1,074 | 4,114 |
| 5 | 2 Ox filler 2 Cu filler | 9609 | 3.8% | 1,988 | 9,848 |
| 6 | 2 Ox filler 2 Cu filler | 9553 | 3.1% | 585 | 2,454 |
| 7 | 2 Ox filler 2 Cu filler | 9997 | 4.1% | 541 | 2,291 |

The results in Table 5 show no apparent deterioration or other trends. Removal rate for Wafer 7 was slightly higher, about 10,000 Angstroms/min vs. an average of about 9,500 for the others. Also, total defects for one of the wafers (Wafer No. 5) was about 2,000, which is over two times that of the others, which likely may have been caused by the sample wafer rather than the polishing pad.

Example 2

Figure 1:
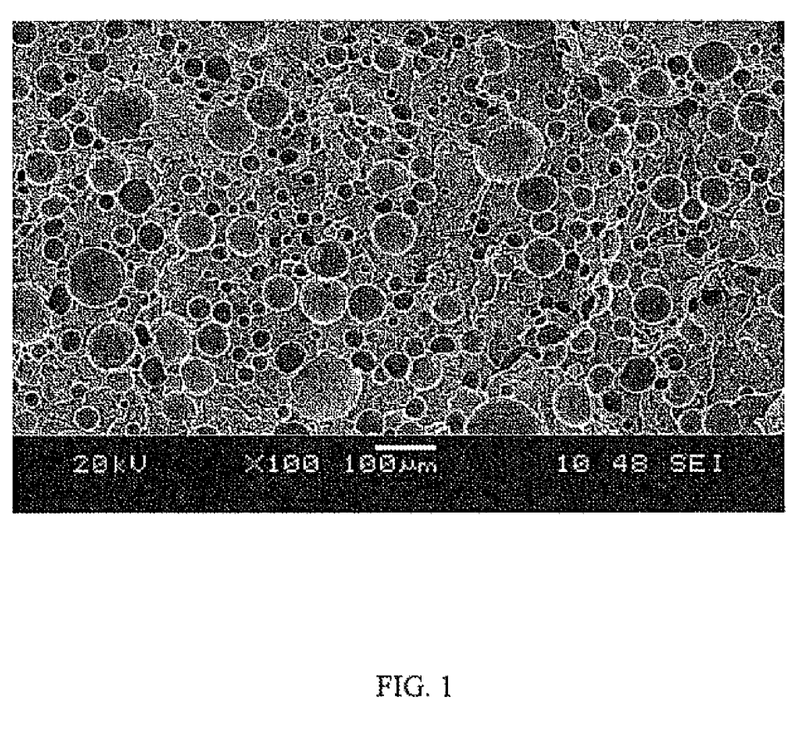
FIG. 1 is scanning electron microscopic image of a comparative porous polyurethane material.
Figure 2:
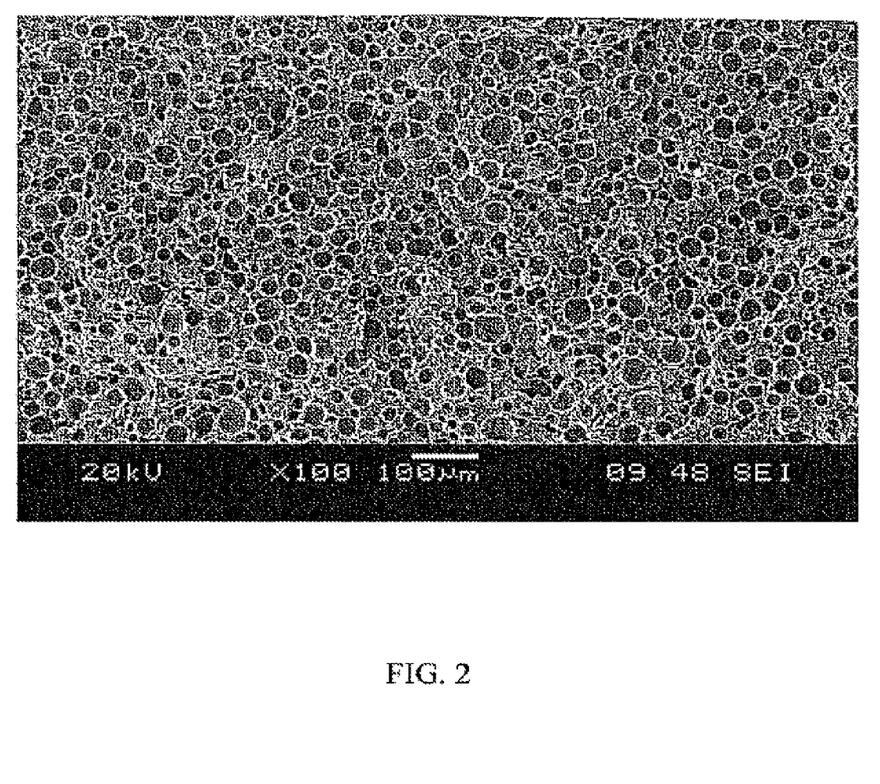
FIG. 2 is scanning electron microscopic image of a porous polyurethane having the same composition as the material of FIG. 1, except with the addition of hydrophobic particles.

Various formulations were prepared containing hydrophobic particles. FIG. 1 shows a scanning electron microscope (SEM) of a polyurethane material generally produced according to the examples described herein without PTFE particulates and FIG. 2 shows a comparable formulation with PTFE particulates. It can be observed that the general effect of the PTFE particulates in the polyurethane foam is to produce smaller and more uniform cells, based on the SEM image.

The skin surface of the polyurethane material of FIG. 2 was measured using the above-described Surface Energy Test. The results for contact angle (CA) and surface energy are shown for in Table 6.

TABLE 6

| | CA (deg) [Tan Method 1] | | | | Surface Energy (mN/m) [Fowkes Method] | | | | | | % Component | |
|---|---|---|---|---|---|---|---|---|---|---|---|---|
| | Water | | diiodomethane | | | | | | | | | |
| Sample | mean | (+/−) | mean | (+/−) | Total | (+/−) | Disperse | (+/−) | Polar | (+/−) | Disperse | Polar |
| Skin surface | 93.3 | 2.13 | 72.2 | 1.92 | 22.26 | 2.20 | 19.21 | 1.30 | 3.06 | 0.90 | 86.3% | 13.7% |

Thus, it is believed that the presence of the hydrophobic particles lowers the surface energy of the polyurethane material. In forming the CMP polishing pad, the skin surface as produced can be ground, which can modify the measured surface energy of the polyurethane.

Examples 3-6

These examples illustrate adjustment of the modulus properties of a polyurethane material for use in a CMP polishing, by varying the concentration of the various components of the reaction mixture for forming the polyurethane material. Top pads based on the two formulations shown in Table 7 were prepared.

TABLE 7

| Material | Example 3 Parts | Example 4 Parts |
|---|---|---|
| Part A | | |
| PTMEG polyol | 66.41 | 63.41 |
| MP Diol | 7.89 | 10.89 |
| Triol | 13.41 | 13.41 |
| Surfactant | 3.76 | 3.76 |
| Catalyst-2* | 5.81 | 5.81 |
| PTFE No. 2 | 4.61 | 4.61 |
| Total, Part A | 101.89 | 101.89 |
| OH # | 280 | 315 |
| Part B | | |
| Isocyanate | 93.01 | 106.65 |

*Diluted in polyol

The microporous top pads produced in accordance with Examples 3 was similar to the formulation of Example 1 above. Example 4 was a formulation for a more firm material. The firmer material of Example 4 contained a relatively higher proportion of low molecular weight chain extender, and the softer material of Example 3 contained a comparatively lower proportion of low molecular weight chain extender.

The various materials were then subjected to dynamic mechanical analysis. Since chemical mechanical polishing is usually not conducted at below room temperature, the results for 20 and 50° C. are presented below for Examples 3-4 and also a comparative polishing pad, C-2 (IC 1000 top pad from Rohm & Haas). Results are shown in Table 8.

TABLE 8

| Property | Ex. 3 | Ex. 4 | Ex. C-2A | C-2B |
|---|---|---|---|---|
| E' at 20° C. (MPa) | 420 | 529 | 363 | 178 |
| E' at 40° C. (MPa) | 349 | 450 | 286* | 138* |
| E' at 50° C. (MPa) | 303 | 396 | 250* | 120* |
| Tan δ at 20° C. | 0.042 | 0.036 | 0.071 | 0.075 |
| Tan δ at 40° C. | 0.048 | 0.039 | 0.073 | 0.080 |
| Tan δ at 50° C. | 0.061 | 0.050 | 0.074 | 0.086 |
| KEL at 20° C. (1/Pa) | 99 | 68 | 195* | 419* |
| KEL at 40° C. (1/Pa) | 136 | 86 | 254* | 574* |
| KEL (1/Pa) at 50° C. | 201 | 126 | 295* | 713* |
| KEL ratio 50° C./20° C. | 2.0 | 1.8 | 1.5 | 1.7 |
| Tan δ ratio 50° C./20° C. | 1.47 | 1.38 | 1.04 | 1.15 |
| E' ratio 50° C./20° C. | 0.72 | 0.75 | 0.68 | 0.69 |

*Discrepancy between measurements for Exs. C-2A and C-2B possibly attributable to perforations in the samples.

Figure 3:
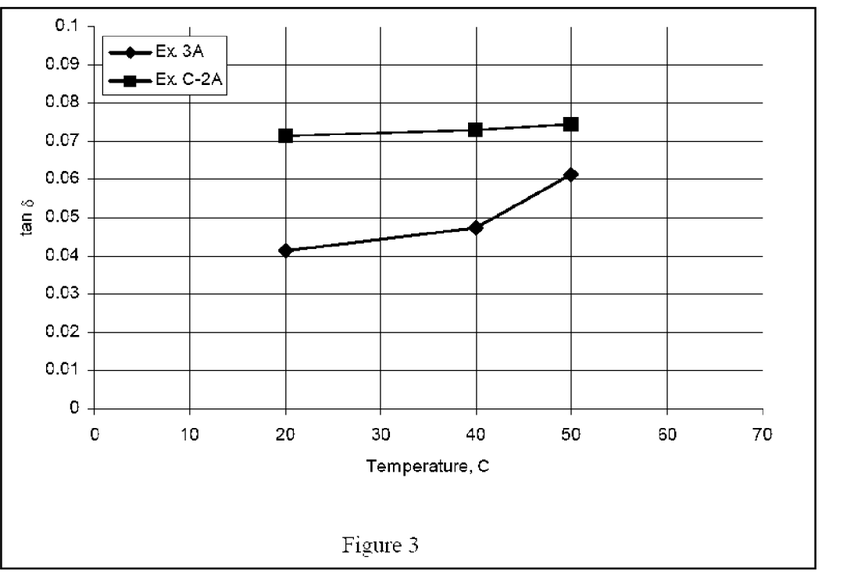
FIG. 3 is a graph showing tan delta measured over the temperature range from 20 to 50° C. for one embodiment of the invention.

Thus, based on the results in Table 8, it was found that a polishing pad simultaneously having comparatively higher storage modulus and lower tan δ and/or lower KEL was produced, in which the KEL ratio and/or tan δ ratio demonstrated relatively low physical property changes over the relevant temperature range of up to 50° C. These properties were found to be associated with advantageous polishing efficiency at a lower defect level, as well as lower temperatures produced during polishing. A graph of tan delta vs. temperature is shown in FIG. 3 for inventive Ex. 3 and comparative Ex. C-2A. This graph shows that the tan delta of the inventive compositions is less than 0.070 over a range of 20° C. to 50° C.

To further test the relationship between modulus, tan δ, and other parameters, a still lower and a still higher modulus top pad was formed from the formulation shown in Table 9.

TABLE 9

| Material | Example 5 Parts | Example 6 Parts |
|---|---|---|
| Part A | | |
| PTMEG polyol | 73.3 | 58.41 |
| MP Diol | 1.00 | 15.89 |
| Triol | 13.41 | 13.41 |
| Surfactant | 3.76 | 3.76 |
| Catalyst-2* | 5.81 | 5.81 |
| PTFE No. 2 | 4.61 | 4.61 |
| Total, Part A | 101.89 | 101.89 |
| OH # | 199 | 373 |
| Part B | | |
| Isocyanate | 67.48 | 124.12 |

*Diluted in polyol

In particular, the top pad produced in accordance with Example 5 was of a lower modulus (softer) polyurethanes, and the top pad produced in accordance with Example 6 was of a higher modulus (firmer) polyurethanes. The material of these top pads were then subjected to dynamic mechanical analysis, as before. In addition, further samples of the formulations of Examples 3-4 were tested. Multiple samples (A, B, etc.) of each pad material were tested and the results are shown in Table 10.

TABLE 10

| Property | Ex. 5A | Ex. 5B | Ex. 5C | Ex. 3A | Ex. 3B | Ex. 3C | Ex. 4A | Ex. 4B | Ex. 4C | Ex. 6A | Ex. 6B |
|---|---|---|---|---|---|---|---|---|---|---|---|
| Density, pcf (kg/m$^3$) | 50.1 (802) | 51 (817) | 69.3 (1110) | 46.5 (745) | 51.2 (820) | 69.8 (1118) | 46 (737) | 69 (1105) | 51 (817) | 45.2 (724) | 52 (833) |
| E' at 20° C. (MPa) | 188 | 133 | 344 | 428 | 517 | 905 | 527 | 1020 | 676 | 637 | 779 |
| E' at 50° C. (MPa) | 82.8 | 55.0 | 153 | 300 | 379 | 636 | 394 | 787 | 515 | 540 | 635 |
| Tan δ at 20° C. | 0.109 | 0.106 | 0.120 | 0.0453 | 0.0457 | 0.0503 | 0.0407 | 0.0406 | 0.0402 | 0.040 | 0.0321 |
| Tan δ at 50° C. | 0.157 | 0.171 | 0.159 | 0.0654 | 0.0574 | 0.0626 | 0.0533 | 0.0500 | 0.0503 | 0.0487 | 0.0361 |
| KEL at 20° C. (1/Pa) | 572 | 786 | 344 | 106 | 88.2 | 55.4 | 77.1 | 39.7 | 59.4 | 62.8 | 41.1 |
| KEL (1/Pa) at 50° C. | 1850 | 3030 | 1010 | 217 | 151 | 98.0 | 135 | 63.4 | 97.4 | 90.1 | 56.7 |
| KEL ratio 50° C./20° C. | 3.23 | 3.85 | 2.94 | 2.05 | 1.71 | 1.77 | 1.75 | 1.597 | 1.60 | 1.44 | 1.38 |

Based on the results in Table 10, it was found that reproducible results could be obtained for a polishing pad having an improved relationship of a comparatively higher storage modulus and relatively lower tan δ and/or lower KEL. A softer pad, however, tends to exhibit a higher tan δ, and a firmer pad tends to exhibit a relatively lower tan δ. Finally, as desired, the KEL ratio and/or tan δ ratio demonstrated relatively low physical property changes over the relevant temperature range of up to 50° C. The desired firmness of the top pad for a particular application, however, may depend on the specific material being polished and the desired polishing rates and defect levels. An important advantage of this invention is the ability to produce a range of densities and thus a range of moduli with the same formulation. Higher densities for a given formulation will produce higher modulus along with fewer cells. Thus, the mechanical and polishing performance properties of the pad can be adjusted by independently controlling the composition and the density.

As used herein, the singular forms "a," "an," and "the" include plural referents unless the context clearly dictates otherwise. The endpoints of all ranges reciting the same characteristic or referring to a quantity of the same component are independently combinable and inclusive of the recited endpoint, as well as throughout the range. The terms "first," "second," and the like do not denote any order, quantity, or importance, but rather are used to distinguish one element from another. All references are incorporated herein by reference.

The present examples and embodiments are to be considered as illustrative and not restrictive and the invention is not to be limited to the details given herein, but may be modified within the scope and equivalence of the appended claims.

What is claimed is:

1. A polyurethane layer, comprising:
a polyurethane foam, wherein the polyurethane foam has a density of about 640 to about 1200 kg/m$^3$, and a plurality of cells having an average diameter of about 20 to about 200 micrometers; and
particles of a hydrophobic polymer having a critical surface energy of less than 35 mN/m, having a median particle size of 3 to 100 micrometers and present in an amount of 0.1 to 5 wt. % of the polyurethane layer;
wherein the polyurethane layer is capable of use in forming a polishing layer of a polishing pad to planarize a workpiece in conjunction with a chemical-mechanical polishing apparatus.

2. The polyurethane layer of claim 1, wherein the critical surface energy of the hydrophobic particles is 10 to 30 mN/m.

3. The polyurethane layer of claim 1, wherein the particles of a hydrophobic polymer have a median particle size of about 25 micrometers.

4. The polyurethane layer of claim 1, wherein the hydrophobic polymer comprises fluorocarbon, fluorochlorocarbon, siloxane, ethylene, propylene, or butylene repeat units, or a combination comprising at least one of the foregoing repeat units.

5. The polyurethane layer of claim 4, wherein the repeat unit is a fluorocarbon or a siloxane.

6. The polyurethane layer of claim 5, wherein the repeat units are tetrafluoroethylene, fluoroethylene, trifluorochloroethylene, dimethylsiloxane, butylene, ethylene, propylene, or a combination comprising at least one of the foregoing monomers.

7. The polyurethane layer of claim 1, wherein the hydrophobic polymer is poly(tetrafluoroethylene).

8. The polyurethane layer of claim 1, wherein the polyurethane foam is the reaction product of
an isocyanate-containing component;
an active hydrogen-containing component reactive with the isocyanate-containing component, and comprising a polyether polyol of the formula $R[(OC_nH_{2n})_zOH]_a$, wherein R is hydrogen or a polyvalent hydrocarbon radical; a is 2-8 and equal to the valence of R; n in each occurrence is an integer from 2-4; and z in each occurrence is 2 to about 200;
a silicone surfactant, and
a catalyst for curing of the foam.

9. The polyurethane layer of claim 8, wherein the polyurethane foam has been made by a process comprising mechanical frothing.

10. The polyurethane layer of claim 8, wherein the isocyanate-containing component comprises a prepolymer that comprises the reaction product of a diisocyanate compound with glycol.

11. The polyurethane layer of claim 8, wherein the polyether polyol is polytetramethylene ether glycol.

12. The polyurethane layer of claim 8, wherein the active hydrogen-containing component further comprises a diol chain extender.

13. The polyurethane layer of claim 8, wherein the surfactant is a nonhydrolyzable silicone glycol copolymer.

14. The polyurethane layer of claim 8, wherein the catalyst is iron acetyl acetonate.

15. The polyurethane layer of claim 1, wherein the polyurethane foam has a density of 640 to about 960 kg/m$^3$.

16. A polishing pad, comprising a polishing layer formed from the polyurethane layer of claim 1, wherein the polishing pad is capable of use in planarizing a work piece in conjunction with a chemical-mechanical polishing apparatus.

17. The polishing pad of claim 16, wherein the polishing pad exhibits a defect rate of less than 3500 based on a 0.25 μm cutoff in a chemical mechanical planarization (CMP) process.

18. The polishing pad of claim 16, wherein the polishing pad exhibits a defect rate of less than 20000 based on a 0.20 μm cutoff in a chemical mechanical planarization (CMP) process.

19. The polishing pad of claim 16, wherein a polishing surface of the polishing layer has been ground to remove a surface skin from the polishing surface.

20. The polishing pad of claim 16, wherein a polishing surface of the polishing layer further comprises grooves.

21. The polishing pad of claim 16, wherein the polishing pad is a composite pad comprising the polishing layer disposed on a substrate layer of another polyurethane foam or elastomeric material that is integrally bonded to the polishing layer.

22. The polishing pad of claim 16, wherein the polishing layer of the polishing pad has been made from a sheet of the polyurethane layer, the sheet having a thickness of 0.5 to 5.0 mm, and wherein the sheet has been punched into the shape of the polishing pad.

23. The polyurethane layer of claim 1, wherein the critical surface energy of the hydrophobic particles is 15-25 mN/m.

24. The polyurethane layer of claim 1, wherein the particles of a hydrophobic polymer have a median particle size of 5 to 50 micrometers.

25. The polyurethane layer of claim 1, wherein the polyurethane layer has a thickness of 0.5 to 5.0 mm.

26. The polyurethane layer of claim 1, wherein the polyurethane layer is capable of forming a polishing layer adapted for polishing a microelectronic work piece or a work piece comprising a semiconductor base material.

27. A method of planarizing a surface of a work piece, comprising applying a particulate media against said surface, and rotating a polishing pad relative to said surface, wherein the polishing pad comprises a polishing layer comprising a polyurethane layer comprising:
  a polyurethane foam, wherein the polyurethane foam has
    a density of about 640 to about 1200 kg/m$^3$, and
    a plurality of cells having an average diameter of about 20 to about 200 micrometers; and
  particles of a hydrophobic polymer having a critical surface energy of less than 35 mN/m, having a median particle size of 3 to 100 micrometers and present in an amount of 0.1 to 5 wt. % of the polyurethane layer.

28. The method of claim 27, wherein polishing is by means of a polishing machine employing a down force of 35 to 700 g/cm$^2$, a platen speed of 25 to 400 rpm, a carrier speed of 25 to 400 rpm, and a media flow of 20 to 500 mL/min.

\* \* \* \* \*